United States Patent [19]

Date et al.

[11] 4,146,317
[45] Mar. 27, 1979

[54] DUAL PRIORITY CAMERA

[75] Inventors: Nobuaki Date, Kawasaki; Tadashi Ito, Yokohama; Yukio Mashimo; Akio Sunouchi, both of Tokyo; Fumio Ito, Yokohama; Yoshiaki Watanabe, Fujisawa

[73] Assignee: Canon Kabushiki Kaisha, Tokyo, Japan

[21] Appl. No.: 872,914

[22] Filed: Jan. 27, 1978

[30] Foreign Application Priority Data

Feb. 4, 1977 [JP] Japan .................................. 52-11279

[51] Int. Cl.² ........................... G03B 7/08; G03B 9/02
[52] U.S. Cl. ...................................... 354/38; 354/43; 354/271; 354/272
[58] Field of Search ....................... 354/26, 28, 29, 30, 354/36, 37, 38, 232, 271, 272, 40, 41, 43

[56] References Cited

U.S. PATENT DOCUMENTS

| | | | |
|---|---|---|---|
| 3,973,266 | 8/1976 | Kakunodate et al. ............. | 354/36 X |
| 4,052,727 | 10/1977 | Ito et al. ............................ | 354/38 X |

*Primary Examiner*—Michael L. Gellner
*Attorney, Agent, or Firm*—Toren, McGeady and Stanger

[57] ABSTRACT

An exposure control apparatus operating with selection of the diaphragm preselection and shutter preselection automatic exposure control modes is provided with first and second signal shapers arranged to cooperate with a lens aperture mechanism through a common intermediate member. Upon setting of a desired diaphragm value in the lens aperture mechanism, the intermediate member is driven along with the first signal shaper in exactly corresponding relation. In the shutter preselection automatic diaphragm control mode, while the first signal shaper is cut off from connection with an exposure value computer, the second signal shaper is driven for scanning operation to produce ever-varying outputs which are compared with the output of the computer upon coincidence to stop movement of the lens aperture mechanism, thereby the scanning result is translated to the proper diaphragm presetting, as the intermediate member is arranged to delay the start of movement of the lens aperture mechanism from the start of the scanning operation by a time interval determined by taking into account the signal response characteristics of the automatic diaphragm adjusting mechanism.

5 Claims, 3 Drawing Figures

DUAL PRIORITY CAMERA

BACKGROUND OF THE INVENTION

1. Field of the Invention

This invention relates to dual priority camera, and more particularly to improvements in the accuracy of exposure control in both of the shutter priority and diaphragm priority modes.

2. Description of the Prior Art

In the dual priority cameras of which the light metering mode is performed at the full open aperture, it is generally required that, when in the diaphragm preselection automatic exposure control mode, an electrical signal representative of the set value of diaphragm aperture be formed to be applied to a shutter time computing circuit for computation of an effective shutter time, while when in the shutter preselection automatic exposure control mode, the position of the driven lens aperture mechanism be scanned to form an electrical signal also which is compared with an output signal of an automatic diaphragm control circuit to adjust the lens aperture mechanism to the proper presetting.

To achieve this, according to the prior art as disclosed in German Laid-Open Patent Application No. 2,415,615, the means for producing the aforesaid two signals are constructed in the form of a single variable resistor arranged to operate in the shutter preselection as well as the diaphragm preselection automatic exposure control modes.

With this single variable resistor operating in the shutter preselection automatic exposure control mode, it is the commonest practice that the shutter release leads to actuation of a diaphragm scanning mechanism with production of ever-varying electrical output signals which are compared with a signal representative of the proper diaphragm aperture value computed, and, when the difference between the magnitudes of these two signals compared has reached a predetermined level, an arresting mechanism is actuated to stop the scanning mechanism from further movement. On the other hand, when in the diaphragm preselection automatic exposure control mode, there is no possibility of creating a time lag in transmitting the output signal of that variable resistor depending upon the adjusted position of the diaphragm ring to the shutter time computing circuit.

As the inertia of the combined lens aperture and scanning mechanisms is rapidly increased with increase in the speed of movement thereof, the diaphragm position responsive signals occurring when in the shutter preselection and diaphragm preselection automatic exposure control modes are differentiated from each other. In other words, the time interval from the moment at which the difference in magnitude between the compared two signals has reached the predetermined level and the moment at which the movement of the lens aperture mechanism driven by the scanning mechanism gets stopped amounts up to a number of milliseconds by which the lens aperture mechanism is overrun to impair the accuracy of automatic diaphragm control.

In order to compensate for such error, with the camera of the single priority, that is, shutter priority type, provision may be made to shift the level by that error. But, with the camera equipped not only with the shutter priority but also with the diaphragm priority, it is made impossible by the level shift to obtain an electrical signal with magnitude exactly proportional to the manually set value of diaphragm aperture.

On this account, in the case of the dual priority camera, whether or not the level shift is electrically effected may be made dependent on selection of the shutter preselection and diaphragm preselection automatic exposure ranges. Even with this, it is impossible to achieve the establishment of the level shift near the start of operation of the diaphragm scanning means, because, in order to arrest the diaphragm scanning means near the start of scanning operation, the control circuit has to produce an actuating signal for the scanning means before the arresting means for the scanning means is actuated.

In the conventional dual priority camera, therefore, the speed of movement of the diaphragm scanning means is controlled so as to minimize the amount of error due to the slow responsibility of the arresting means and the inertia of the lens aperture and scanning means. The residual error is, however, not so much small as desired, and the decrease in the speed of automatic adjustment of the diaphragm aperture value will result in failure of snap photography.

The present invention has for its general object to provide a dual priority camera which has overcome the above-mentioned conventional drawbacks.

To achieve this, the signal representative of the set value of diaphragm aperture and the signal representative of the scanned value of diaphragm aperture are formed by respective separate means operating independently of each other, so that the error of diaphragm control which would be otherwise encountered when the common signal forming means is rendered operative in the shutter preselection automatic exposure range can be prevented from occurring.

Other objects and features of the invention will become apparent from the following detailed description of a specific embodiment thereof taken in conjunction with the accompanying drawings in which:

DESCRIPTION OF THE PREFERRED EMBODIMENT

Figure 1:
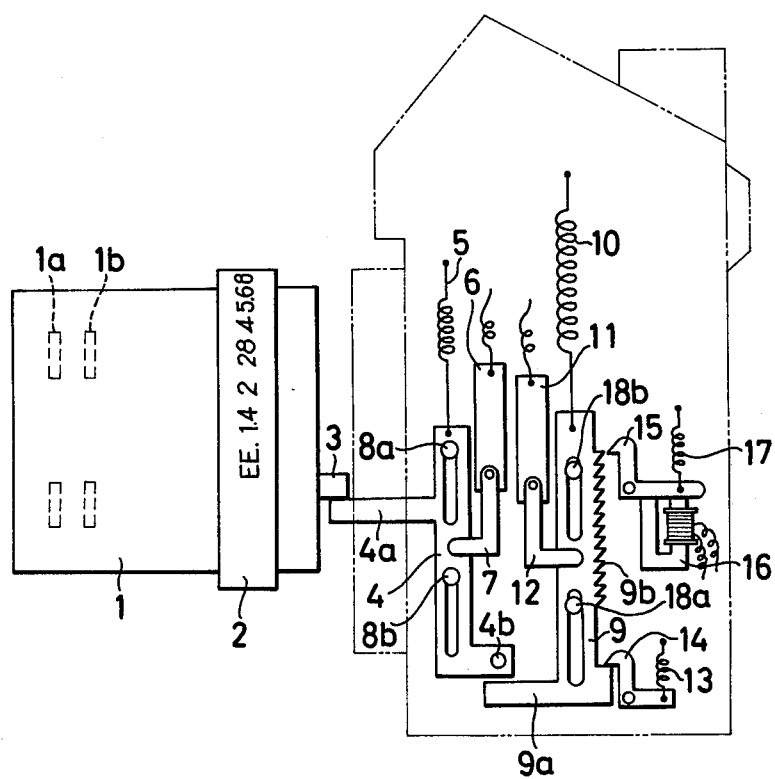
FIG. 1 is a schematic elevational view of one embodiment of a dual priority camera according to the present invention.

Referring to FIG. 1, at front of a camera housing, there is shown an interchangeable lens 1 having incorporated therein a diaphragm 1a with a presetting means 1b operatively connected to a diaphragm ring 2. Rearwardly extending from the rear end of the barrel 1, a pin 3 serves as an input member for the presetting means 1b when the shutter preselected automatic exposure control mode is selected, and also as an output member therefor when in the diaphragm preselection automatic exposure control mode.

In the camera housing, there is provided an intermediate member 4 in the form of a slide having two longitudinally elongated slots in which respective guide pins 8a and 8b are engaged to vertical movement of the slide 4 as viewed in the figure. A spring 5 is connected between the camera housing and one end of the slide 4, causing the latter to follow up the output member 3 of the presetting means 1b in abutting engagement at an arm 4a thereof. Positioned in parallel to the path of movement of slide 4 is a resistance track 6 constituting together with a slider 7 fixedly mounted on slide 4 a variable resistor capable of producing an electrical signal with magnitude proportional to the set value of diaphragm aperture by the diaphragm ring 2.

A diaphragm scanning mechanism includes a driving member or slide 9 which is powered by a spring 10 for movement in an upward direction while being guided by a pair of pins 18a and 18b and which fixedly carries a slider 12 constituting together with a resistance track 11 a variable resistor capable of producing an electricl signal with magnitude proportional to the amount of displacement of the slide 9 from the illustrated position in which it is latched by a pawl lever 14 under the action of a spring 13. This slide 9 has an arm 9a arranged in a spaced relation to an abutment pin 4b extending from the intermediate slide 4 when the slide 9 is latched by the lever pawl 14 and when the presetting means 1b is set in the aperture full open position, and, after the abutting engagement of the arm 9a with the pin 4b, to enable the intermediate slide 4 to move the presetting means through the entire range of diaphragm aperture values available in the associated lens 1. To arrest the scanning mechanism there is provided a series of saw teeth 9b formed in a portion of one side of the slide 9 in combination of an arresting pawl lever 15 arranged upon deenergization of an electromagnet 16 to be brought into engagement with one of the saw teeth 9b under the action of a spring 17.

Figure 2:
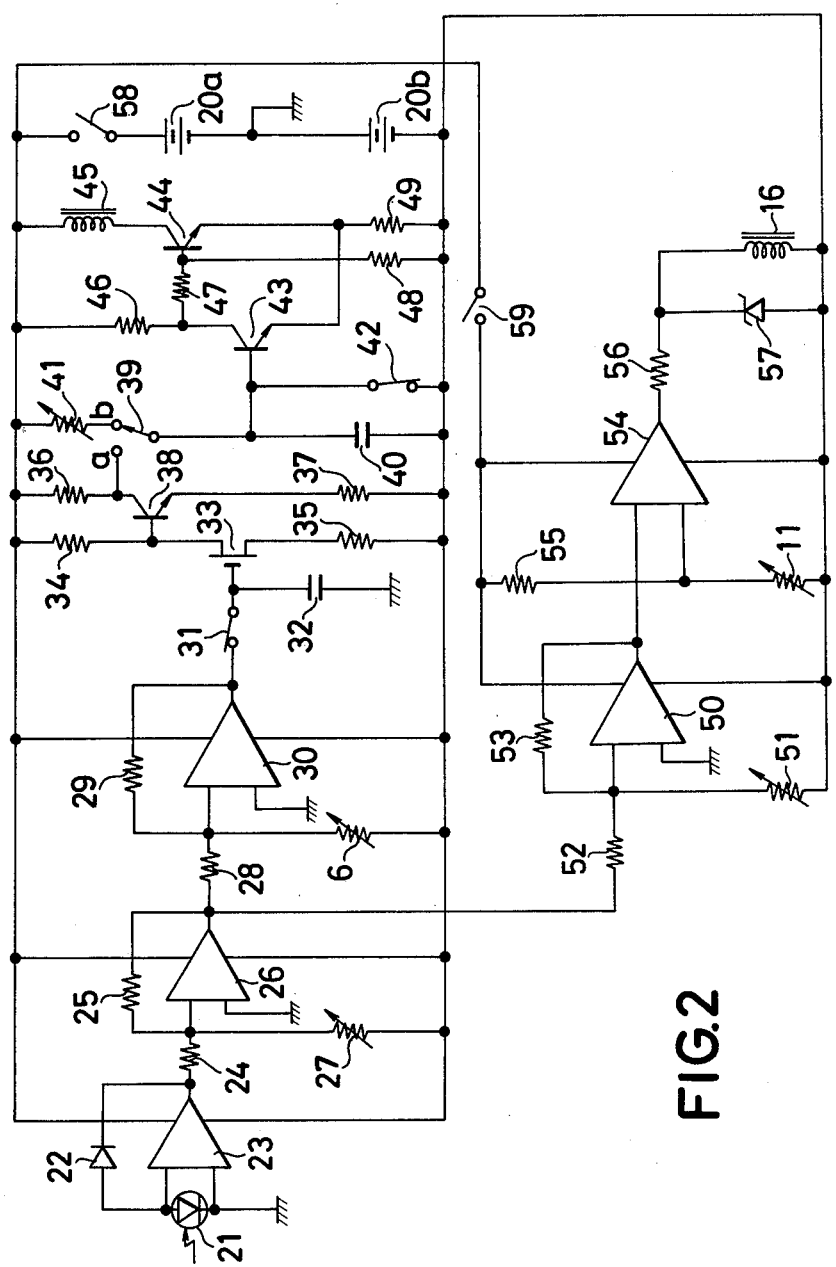
FIG. 2 is an electrical circuit diagram of an exposure control apparatus for the camera of FIG. 1.

The first signal shaper or variable resistor 6 and the combined second signal shaper or variable resistor 11 and electromagnet 16 are selectively rendered operative in an exposure control circuit of FIG. 2 with electrical power supply from a pair of batteries 20a and 20b through a normally open main switch 58, depending upon either of the diaphragm preselection and shutter preselection automatic exposure ranges. This circuit includes a sensor, film speed setter, shutter time computer, timing circuit, trigger circuit selectively responsive to the shutter time computer and the timing circuit for controlling actuation of an electromagnet 45, diaphragm value computer, and comparator 54 responsive to attainment of the output of the second variable resistor 11 to a level dependent upon the output of the diaphragm value computer for controlling actuation of the arresting electromagnet 16, each of which will next be explained in detail.

The sensor comprises a photo-sensitive element 21 such as silicon photo-cell, connected between two inputs of an operational amplifier 23, and a logarithmic compression diode 22 connected in the feedback network of the operational amplifier 23.

The film speed setter comprises a variable resistor 27 cooperative with a film speed dial not shown, and an inversion amplifier device 24, 25 and 26 connected to the outputs of the sensor and the variable resistor 27.

The shutter time computer comprises resistors 28 and 29 and an operational amplifier 30 to which the output of the first signal shaper 6 is applied. The output of this computer is applied to a storage capacitor 32 through a switch 31 which is arranged to be opened when the reflex mirror not shown is flipped upward. The storage capacitor 32 is connected to a field effect transistor 33 with bias resistors 34 and 35. Responsive to the output of transistor 33, a transistor 38 controls charging of a timing capacitor 40 through a first mode selector switch 39, provided that switch 39 is set in "a" position. When the switch 39 is turned to "b" position, the transistor is taken out of connection with the capacitor 40, but instead a variable resistor 41 cooperative with the shutter dial 60 (see FIG. 3) is connected therewith. The variable resistor 41 and capacitor 40 constitute the aforementioned timing circuit. Connected across the capacitor 40 is a count start switch 42.

The trigger circuit is comprised of two transistors 43 and 44 and four bias resistors 46 to 49. The solenoid of electromagnet 45 is connected between the positive but and the collector of transistor 44.

The diaphragm value computer is comprised of two resistors 52 and 53 and an operational amplifier 50 to which the output of a shutter time setting variable resistor 51 is applied. The output of the operational amplifier 50 is applied as a first input signal to the comparator 54 and the divided voltage by the resistors 11 and 55 is applied thereto as a second input signal. The output of the comparator 54 is applied through a resistor 56 to a Zener diode 57 and the solenoid of arresting electromagnet 16 connected in parallel to each other. The computer and comparator are supplied with electrical power from the batteries 20a and 20b through a control switch 59 arranged as shown in FIG. 3.

Figure 3:
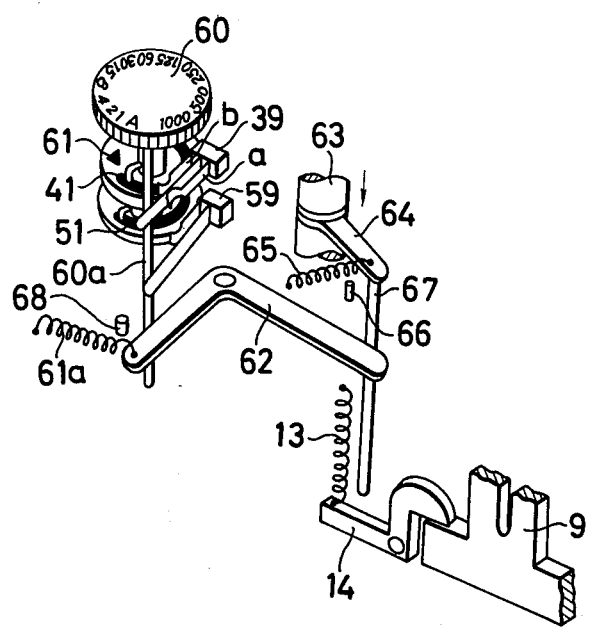
FIG. 3 is a perspective view of a mode selecting device for use in the camera and apparatus of FIGS. 1 and 2.

FIG. 3 shows a shutter time setting mechanism and a mode selecting mechanism operating therewith. The shutter dial 60 is shown as placed with its symbol "A" in registry with a stationary index mark 61. In this illustrated position, the diaphragm preselection mode is operative. The aforesaid variable resistors 41 and 51 of FIG. 2 are mounted on respective discs concentric to the common axis of the shutter dial 60. The shutter dial 60 is provided with an elongated pin 60a downwardly extending from the lower surface thereof. Positioned against the pin 60a are the movable contacts of the switches 39 and 59 so that when in "A" position, the switch 39 is in "a" position and the switch 59 is open. When the shutter dial 60 is turned to place the symbol "A" out of registry with the index mark 61, the switch 39 is set from "a" to "b" position, and the switch 59 is closed. At the same time, a L-shape lever 62 is permitted to turn in a clockwise direction under the action of a spring 61a. Such clockwise movement of the L-shape lever 62 causes a rod 67 to be brought into alignment with the tail of the latching lever 14 shown in FIG. 1 by the action of a spring 65, as a support lever 64 for the rod 67 abuts against a stopper pin 66. This support lever 64 is pivotally mounted on a shaft 63 cooperative with a shutter release button not shown. In this state, when the shutter button is depressed, the scanning drive member 9 is disengaged from the lever pawl 14 as the rod 67 strikes the lever 14 at its tail.

The operation of the dual priority camera of FIGS. 1 to 3 is as follows. For exposure control in the diaphragm preselection mode, the operator will first turn the film speed dial to set the sensitivity of the used film in the variable resistor 27 and then turn the shutter dial 60 to place the symbol "A" in registry with the index 61, thereby the switch 39 is set to "a" position, the switch 59 is opened, and the L-shape lever 62 is turned counter-clockwise to take the rod 67 out of alignment with the latching lever 14. Thus the diaphragm scanning mechanism is rendered inoperative.

Upon setting of a desired diaphragm value by manually operating the diaphragm ring 2, the output member 3 of the presetting means 1b is moved upward in engagement with the intermediate member 4 under the action of the spring 5 so that the variable resistor 6 takes a resistance value corresponding to the set value of diaphragm aperture.

When the shutter button is depressed to a first stroke, the main switch 58 is closed to render operative the automatic shutter control circuit. The photosensitive element 21 produces an output proportional to the level of brightness of an object being photographed. This output after logarithmically compressed by the converter 22, 23 is combined with the output of the film speed setting resistor 27 by the operational amplifier 26 and then with the output of the diaphragm value setting resistor 6 by the operational amplifier 30 to produce an output representative of an exposure value, i.e. shutter speed, and which is stored on the capacitor 32.

Upon further depression of the shutter button to the second stroke, the memory switch 31 is opened to hold the stored value of charge on the capacitor 32, while permitting the mirror to be flipped upward in a manner known in the art, and the automatic diaphragm closing down mechanism to be actuated, thereby the actual size of aperture opening defined by the diaphragm blades 1a is adjusted to the manually set value. Subsequent thereto, the front shutter curtain starts to run down to an aperture full open position. At the same time, the switch 42 is opened to start charging of the timing capacitor 40 as controlled by the transistor 38 in accordance with the stored voltage on the capacitor 32. At the termination of duration of the computed shutter time, the voltage on the capacitor 40 reaches the trigger level so that the transistor 44 is turned off to deenergize the solenoid of electromagnet 45 controlling operation of the rear shutter curtain, thereby the exposure is terminated.

For exposure control in the shutter preselection mode, the shutter dial 60 is turned from "A" position to set a desired shutter time in both of the variable resistors 41 and 51. At this time, the switch 39 is set to "b" position and the switch 59 is closed to render operative the automatic diaphragm control circuit. Further, the lever 62 is turned clockwise by the spring 61a until it abuts against the stopper pin 68. As the lever 62 is retracted from the rod 67, the lever 64 is turned clockwise by the spring 65 until it abuts against the stopper pin 66.

When the shutter release button is depressed to the first stroke, the light value from the operational amplifier 26 is combined with the preselected shutter time from the variable resistor 51 by the operational amplifier 50 to produce an output representative of an exposure value, i.e., diaphragm value, and which is applied to the first input of the comparator 54. The first stroke of depression of the shutter release button also causes clockwise movement of the latching lever 14 which in turn causes the slide 9 to start scanning operation under the action of spring 10. During the movement of the slide 9, the resistance value of the variable resistor 11 continues to vary part a point at which the arm 9a engages with the pin 4b. As the intermediate member 4 is driven for upward movement by the slide 9, the presetting means 1b for the diaphragm 1a is operated, moving from the full open position. When the voltage appearing at a point on connection between the resistors 11 and 55 and sensed by the comparator 54 has reached the output of the operational amplifier 50, the solenoid of electromagnet 16 is deenergized, causing the arresting lever 15 to be turned counterclockwise under the action of spring 17 to engage at its pawl with one of the teeth 9b.

Thus the slide 9 gets stopped from further upward movement. This stoppage is accompanied with those of the intermediate member 4 and the input member 3 of the presetting means 1b.

Upon further depression of the shutter button, the mirror is flipped upward, then the automatic diaphragm closing down mechanism is actuated, and then the front shutter curtain is released to run down with simultaneous occurrence of opening of the switch 42. The timing capacitor 40 is charged through the variable resistor 41. At the termination of duration of the preselected shutter time, the transistor 43 is turned on and the transistor 44 is turned off to deenergize the solenoid of electromagnet 45, thereby the rear shutter curtain is released to run down.

According to one of the feature of the invention, the time interval from the moment at which the scanning slide 9 starts to move to the moment at which the arm 9a of the slide 9 arrives at the position of the pin 4b on the intermediate slide 4 is made equal to or longer than that from the moment at which the two inputs of the comparator 54 coincides with each other to the moment at which the upward movement of the scanning slide 9 is stopped by the arresting lever 15, usually a few milliseconds. As a result, in the shutter preselection automatic diaphragm control mode, a premature actuation of the arresting electromagnet is effected to improve the accuracy of exposure control and also to enable automatic adjustment of the diaphragm aperture to the full open value which was previously impossible to perform.

The mechanical aspect of the present invention is that provision is made between the output member of the automatic diaphragm adjusting mechanism and the input member of the diaphragm presetting mechanism for interrelating them to each other in a time-displaced manner. In one form of the invention, such interrelation is achieved by use of an intermediate member arranged in spaced relation to the adjusting mechanism, and this intermediate member is utilized as an operating member for a first signal shaper capable of producing a signal representative of the manually preset value of diaphragm aperture, while a second signal shaper capable of producing a signal representative of the automatically adjusted value of diaphragm aperture is made cooperative with the diaphragm adjusting mechanism, so that the otherwise introduced error of automatic adjustment of diaphragm aperture can be compensated for to assure the high accuracy of exposure control even in the shutter priority mode.

What is claimed is:
1. A dual priority camera capable of selectively performing shutter preselection automatic exposure and diaphragm preselection automatic exposure, said camera including:
(a) a photo-taking lens, said lens having a diaphragm and a diaphragm presetting means for said diaphragm;
(b) light-measuring means for measuring light transmitted through said photo-taking lens, said means generating an electrical signal corresponding to the light transmitted through the photo-taking lens;
(c) shutter time information setting means, said means generating an electrical signal corresponding to the set value of shutter time;
(d) diaphragm computing means for computing the output signal of said light measuring means and the output signal of said shutter time information set- ting means, said means producing an electrical signal corresponding to the computed value of diaphragm aperture;
(e) an intermediate member cooperative with said diaphragm presetting means;
(f) a diaphragm adjusting member engageable with said intermediate member, said member being operated in response to the release actuation of the camera and engaging with said intermediate member after a predetermined time from the start of operation;
(g) first diaphragm value signal forming means cooperative with said intermediate member, said means generating an electrical signal corresponding to the preset diaphragm value by said diaphragm presetting means;
(h) second diaphragm value signal forming means cooperative with said diaphragm adjusting means, said means generating an electrical signal corresponding to the adjusted amount of said diaphragm adjusting means;
(i) comparing means for comparing the computed diaphragm value of said diaphragm computing means and the signal output value of said second diaphragm value signal forming means, said means producing a signal when the difference between the both values has reached a predetermined value;
(j) lock means causing operation of said diaphragm adjusting means to stop said means being actuated by the output signal of said comparing means;
(k) shutter time computing means for computing the signal output of said light measuring means and the signal output of said first diaphragm value signal forming means, said means producing an electrical signal corresponding to the computed shutter time value;
(l) memory means for memorizing the output signal of said shutter time computing means; and
(m) shutter time control means, said means controlling shutter time based on the memorized value of said memory means when in the diaphragm preselection mode, and in accordance with said set value of shutter time when in the shutter preselection mode.

2. A dual priority camera according to claim 1, wherein a predetermined time from the actuation of said diaphragm adjusting member to the engagement with the intermediate member is made longer than that necessary from the production of the signal from said comparing means to the stoppage of operation of the diaphragm adjusting means by the actuation of the lock means.

3. A dual priority camera according to claim 2, further including shutter time signal forming means, said means being responsive to said shutter time information setting means to produce an electrical signal corresponding to the set shutter time, and said signal being applied to said shutter time control means when in the shutter preselection mode.

4. A dual priority camera according to calim 3, wherein said shutter time control means has changeover means, said changeover means effecting connection to said shutter time signal forming means when in the shutter preselection mode, and to said memory means when in the diaphragm preselection mode.

5. A dual priority camera capable of selectively performing shutter preselection automatic exposure and diaphragm preselection automatic exposure, said camera including:
(a) a photo-taking lens, said lens having a diaphragm and a diaphragm presetting means for said diaphragm;
(b) light-measuring means for measuring light transmitted through said photo-taking lens, said means generating an electrical signal corresponding to the light transmitted through the photo-taking lens;
(c) shutter time information setting means, said means generating an electrical signal corresponding to the set value of shutter time;
(d) diaphragm computing means for computing the output signal of said light measuring means and the output signal of said shutter time information setting means, said means producing an electrical signal corresponding to the computed diaphragm aperture value;
(e) an intermediate member cooperative with said diaphragm presetting means;
(f) a diaphragm adjusting member engageable with said intermediate member, said member being operated in response to the release actuation of the camera and engaging with said intermediate member after a predetermined time from the start of operation;
(g) first diaphragm value signal forming means cooperative with said intermediate member, said means generating an electrical signal corresponding to the preset diaphragm value by said diaphragm presetting means;
(h) second diaphragm value signal forming means cooperative with said diaphragm adjusting means, said means generating an electrical signal corresponding to the adjusted amount of said diaphragm adjusting means;
(i) comparing means for comparing the computed diaphragm value of said diaphragm computing means and the signal output value of said second diaphragm value signal forming means, said means producing a signal when the difference between the both values has reached a predetermined value;
(j) lock means causing operation of said diaphragm adjusting means to stop, said means being actuated by the output signal of said computing means; and
(k) shutter time determining means for computing the signal output of said light measuring means and the signal output of said first diaphragm value signal forming means to determine a shutter time, said means having means for controlling shutter time in accordance with said set shutter time.

* * * * *